No. 893,999. PATENTED JULY 21, 1908.
J. B. HART.
FEED GEARING.
APPLICATION FILED APR. 7, 1908.

WITNESSES
F. C. Bany
Perry B. Turpin

INVENTOR
JOHN B. HART
BY Munn & Co.
ATTORNEYS

UNITED STATES PATENT OFFICE.

JOHN BATTELLE HART, OF CLARKSBURG, WEST VIRGINIA.

FEED-GEARING.

No. 893,999.  Specification of Letters Patent.  Patented July 21, 1908.

Application filed April 7, 1908. Serial No. 425,673.

*To all whom it may concern:*

Be it known that I, JOHN BATTELLE HART, a citizen of the United States, and a resident of Clarksburg, in the county of Harrison and State of West Virginia, have invented certain new and useful Improvements in Feed-Gearing, of which the following is a specification.

This invention is an improvement in feed mechanism of saw mill carriages, and particularly in that class of such devices illustrated by my former patent #762,713, issued June 14, 1904; and the present invention consists in certain novel constructions and combinations of parts as will be hereinafter described and claimed.

Figure 1:
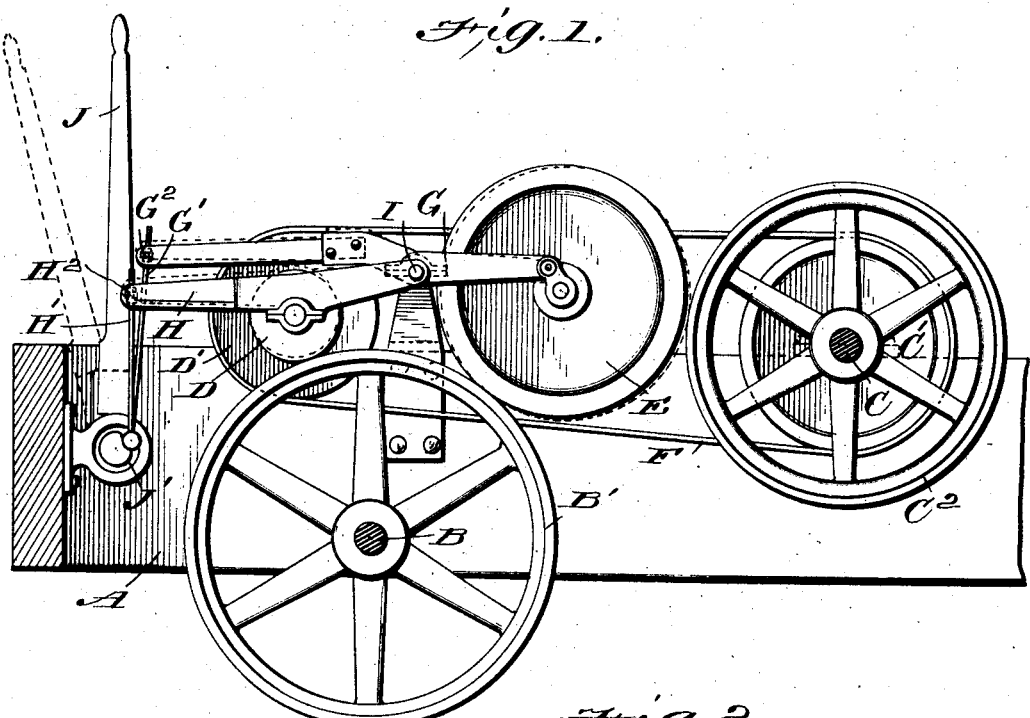
Figure 2:
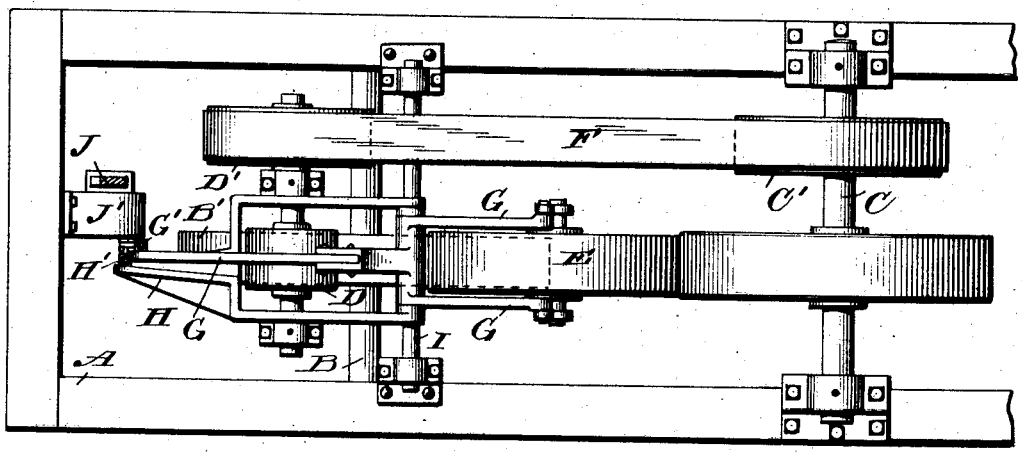
Figure 3:
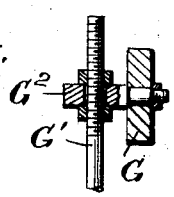

In the drawings, Figure 1 is a side elevation of my invention, part of the saw frame being shown in section, and part broken away. Fig. 2 is a detail plan view of my improvement. Fig. 3 is a detail view illustrating the adjustable connection between the links and their rockers.

In my former patent above referred to I employ in connection with an operating rocker, an intermediate rocker arranged for operation by the operating rocker through the aid of an arm extending from said operating rocker over the intermediate rocker which carries an intermediate friction pulley operated by the operating rocker.

In my present invention the intermediate friction pulley is carried by a rocker which is operated directly instead of through the aid of the rocker carrying the first, or what for convenience of reference, I shall term the main friction pulley, such operation of the intermediate rocker being for reasons more fully described hereinafter.

In connection with a suitable frame A, the feed shaft or axle B, and the saw mandrel C I provide a pulley B' on the shaft B, a main friction pulley D, an intermediate friction pulley E, band pulleys D' and C' connected by a band F, whereby motion may be transmitted from the mandrel C to the friction pulley D, and rockers G and H carrying respectively the intermediate friction pulley E, and the main friction pulley D. These rockers G and H are pivoted on a common center at I, the rocker G being pivoted between its ends, and the rocker H being pivoted at one end, and these rockers G and H are connected by links G' and H' respectively, with an eccentric J' operated by a hand lever J.

The rocker G is pivoted between its ends, and has the intermediate friction pulley E suspended from one end and its opposite end connected with the operating device J, while the lever H is pivoted at one end, bears its friction pulley D between its ends and is connected at its other end with the operating device so that as the latter is operated in one direction or the other it similarly operates the adjacent ends of the two rockers, and if it is operated to lift said ends of the rockers it will raise the friction pulley D clear of the friction pulley B' on the feed shaft, and will lower the friction pulley E so the latter, which runs at all times on the friction pulley B' will come in contact with the friction pulley $C^2$ on the saw member and be driven by such pulley $C^2$ in such manner as to reverse the direction of the movement of the feed shaft B.

The links G' and H' are preferably adjustably connected with their rockers at $G^2$ and $H^2$ so they may be adjusted independently of each other and in such manner as to secure the desired bearing of the frictions E and D when thrown into position for use.

I claim—

1. The combination of an intermediate friction pulley, a main friction pulley, a lever pivoted between its ends and connected at one end with the intermediate friction pulley, a rocker pivoted at one end and carrying the main friction pulley between its ends, the free ends of the two rockers being extended adjacent to each other, and operating devices connected with such free ends of the rockers and adapted to move said ends in the same direction whereby such similar movement will lift one of the friction pulleys and lower the other substantially as set forth.

2. The combination with a friction pulley to be driven, of a rocker pivoted between its ends above said friction pulley, a rocker pivoted at one end above the said friction pulley, a friction pulley between the ends of the second rocker, operating devices connected with the free end of said rocker and with one end of the first rocker, and a friction pulley carried by the other end of the first rocker, substantially as set forth.

3. The combination with a friction pulley to be driven, of a main friction pulley for driving it in one direction, an intermediate friction pulley for driving it in the reverse direction, independent rockers carrying said main and intermediate friction pulleys, and operating devices having a positive connection with both said rockers, substantially as set forth.

4. The combination of a friction pulley to be driven, a main friction pulley, an intermediate friction pulley, a pivoted rocker carrying the main friction pulley between its pivoted and its outer end, a rocker pivoted between its ends and carrying the intermediate friction pulley at its end opposite its outer end, the latter being extended adjacent to the outer end of the rocker carrying the main friction pulley, and operating devices connected with the adjacent outer ends of the two rockers, substantially as set forth.

JOHN BATTELLE HART.

Witnesses:
L. G. LEPLEY,
O. A. ANNAN.